(12) United States Patent
Hicks et al.

(10) Patent No.: US 12,617,522 B2
(45) Date of Patent: May 5, 2026

(54) SYSTEMS AND METHODS OF AIRCRAFT LIFT CONTROL

(71) Applicant: THE BOEING COMPANY, Arlington, VA (US)

(72) Inventors: Luke Casey Hicks, Everett, WA (US); Aswin Chandar Nambi Kuppusamy Chandrasekaran, Bangalore (IN); Vinayak M Nyamagoudar, Bengaluru (IN)

(73) Assignee: THE BOEING COMPANY, Arlington, VA (US)

( * ) Notice: Subject to any disclaimer, the term of this patent is extended or adjusted under 35 U.S.C. 154(b) by 120 days.

(21) Appl. No.: 18/325,359

(22) Filed: May 30, 2023

(65) Prior Publication Data

US 2024/0400194 A1 Dec. 5, 2024

(51) Int. Cl.
B64C 13/04 (2006.01)
B64C 13/14 (2006.01)
B64C 13/50 (2006.01)
B64D 45/00 (2006.01)

(52) U.S. Cl.
CPC .......... B64C 13/0425 (2018.01); B64C 13/14 (2013.01); B64C 13/50 (2013.01); B64D 45/0005 (2013.01)

(58) Field of Classification Search
CPC .......................... B64C 13/0425; B64C 13/507
See application file for complete search history.

(56) References Cited

U.S. PATENT DOCUMENTS

| | | | | |
|---|---|---|---|---|
| 10,513,346 | B2 * | 12/2019 | Ouellette | ........... B64D 45/0005 |
| 2015/0088340 | A1 | 3/2015 | Moser et al. | |
| 2015/0105945 | A1 * | 4/2015 | Moser | ........................ B64C 9/28 |
| | | | | 701/3 |
| 2017/0106971 | A1 * | 4/2017 | Wilkens | ................ B64C 13/503 |
| 2019/0072958 | A1 | 3/2019 | Turetta et al. | |
| 2019/0161203 | A1 * | 5/2019 | Worsham, II | .......... B64D 45/00 |

OTHER PUBLICATIONS

"Automatic Flaps," Ardupilot, retrieved May 30, 2023, https://ardupilot.org/plane/docs/automatic-flaps.html, pp. 1-2.
Extended European Search Report for application No. 24165044.9 dated Sep. 16, 2024, pp. 1-8.

* cited by examiner

*Primary Examiner* — Nicholas McFall
*Assistant Examiner* — Eric Acosta
(74) *Attorney, Agent, or Firm* — Moore IP Law

(57) ABSTRACT

An aircraft includes actuators coupled to a lift device. The aircraft also includes a lift device control interface disposed on a flight deck of the aircraft. The lift device control interface is configured to receive a pilot input. The aircraft further includes a flight control system configured to generate a command corresponding to a target lift device position. The flight control system is also configured to send the command to the lift device control interface to cause the lift device control interface to indicate the target lift device position. The flight control system is further configured to send a control signal to the actuators to set the lift device to the target lift device position.

20 Claims, 8 Drawing Sheets

Figure 3:
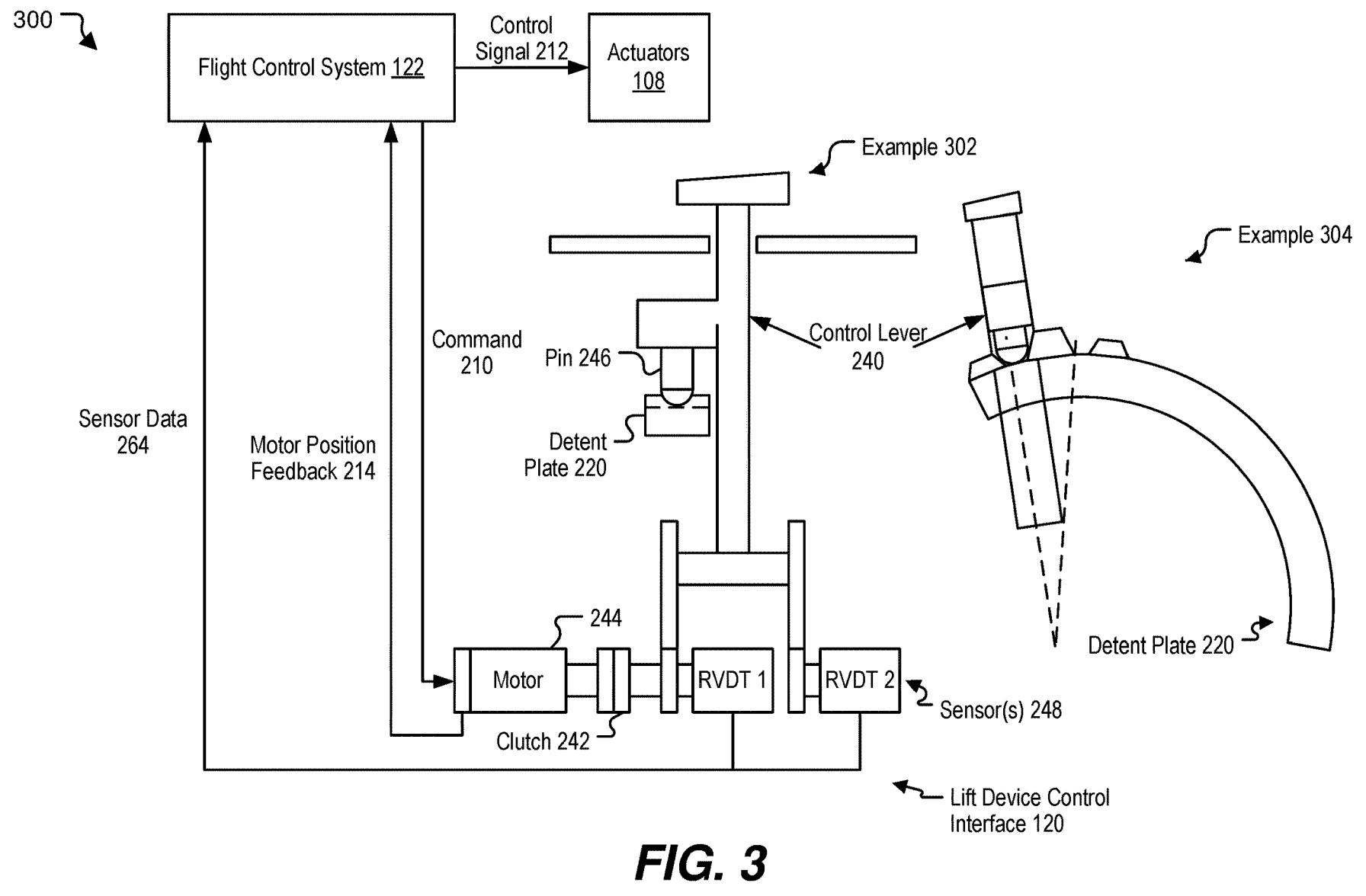

Example 304

Example 302

Detent Plate 220

Sensor(s) 248

Lift Device Control Interface 120

Control Lever 240

RVDT 2

RVDT 1

Command 210

Pin 246

Detent Plate 220

244

Motor

Clutch 242

Actuators 108

Control Signal 212

Flight Control System 122

Motor Position Feedback 214

Sensor Data 264

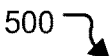

500

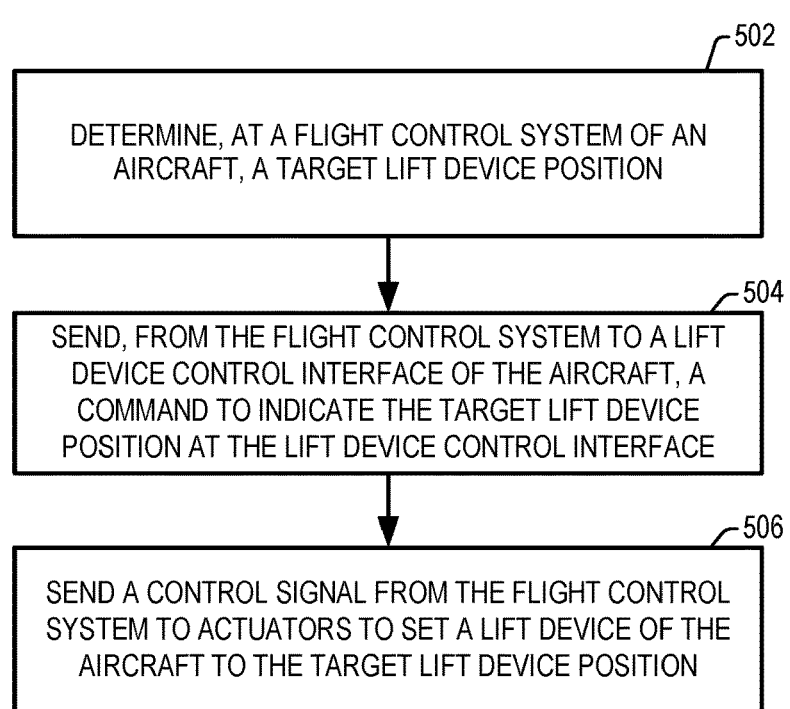

502

DETERMINE, AT A FLIGHT CONTROL SYSTEM OF AN
AIRCRAFT, A TARGET LIFT DEVICE POSITION

504

SEND, FROM THE FLIGHT CONTROL SYSTEM TO A LIFT
DEVICE CONTROL INTERFACE OF THE AIRCRAFT, A
COMMAND TO INDICATE THE TARGET LIFT DEVICE
POSITION AT THE LIFT DEVICE CONTROL INTERFACE

506

SEND A CONTROL SIGNAL FROM THE FLIGHT CONTROL
SYSTEM TO ACTUATORS TO SET A LIFT DEVICE OF THE
AIRCRAFT TO THE TARGET LIFT DEVICE POSITION

*FIG. 5*

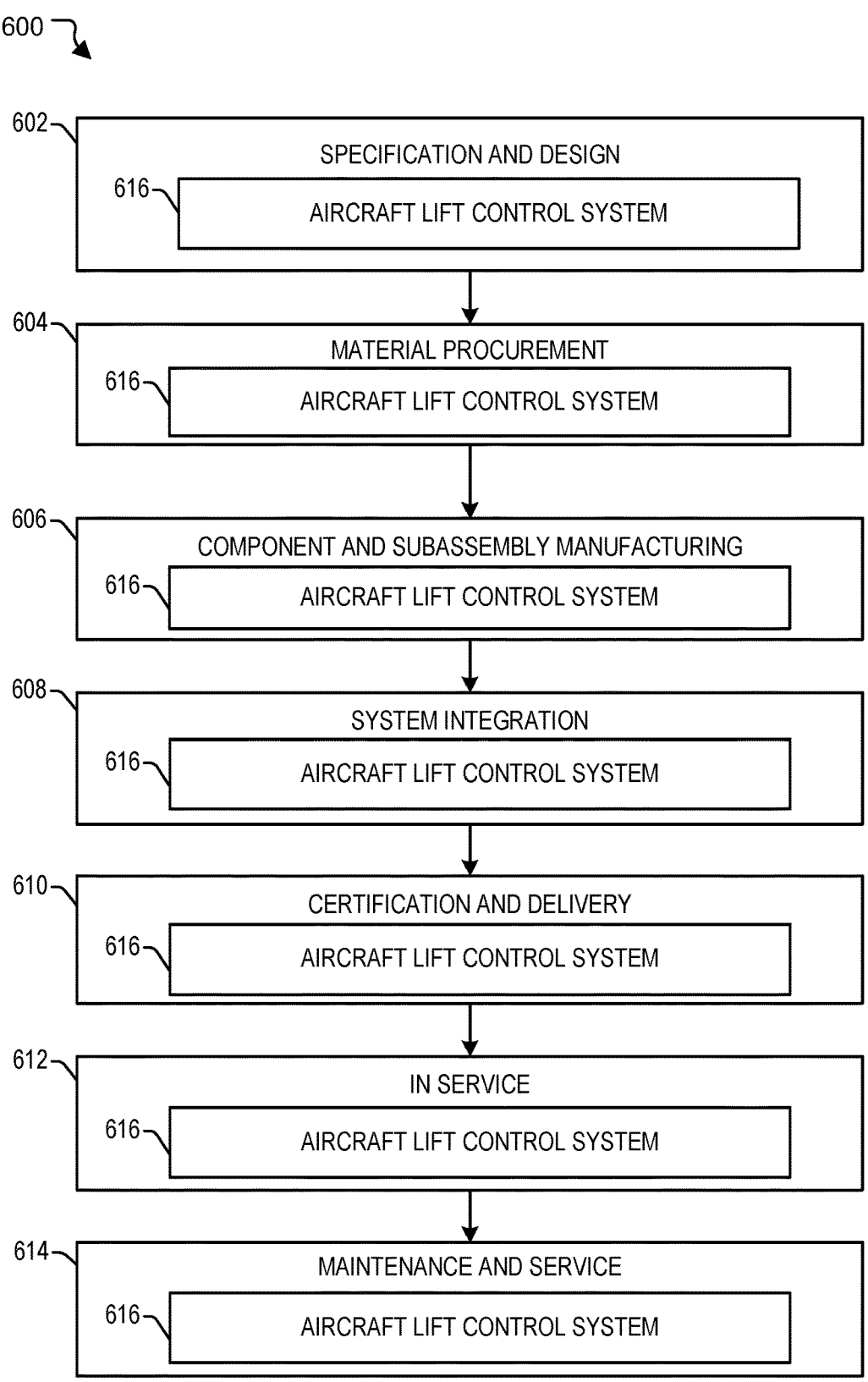

600

602 SPECIFICATION AND DESIGN

616 AIRCRAFT LIFT CONTROL SYSTEM

604 MATERIAL PROCUREMENT

616 AIRCRAFT LIFT CONTROL SYSTEM

606 COMPONENT AND SUBASSEMBLY MANUFACTURING

616 AIRCRAFT LIFT CONTROL SYSTEM

608 SYSTEM INTEGRATION

616 AIRCRAFT LIFT CONTROL SYSTEM

610 CERTIFICATION AND DELIVERY

616 AIRCRAFT LIFT CONTROL SYSTEM

612 IN SERVICE

616 AIRCRAFT LIFT CONTROL SYSTEM

614 MAINTENANCE AND SERVICE

616 AIRCRAFT LIFT CONTROL SYSTEM

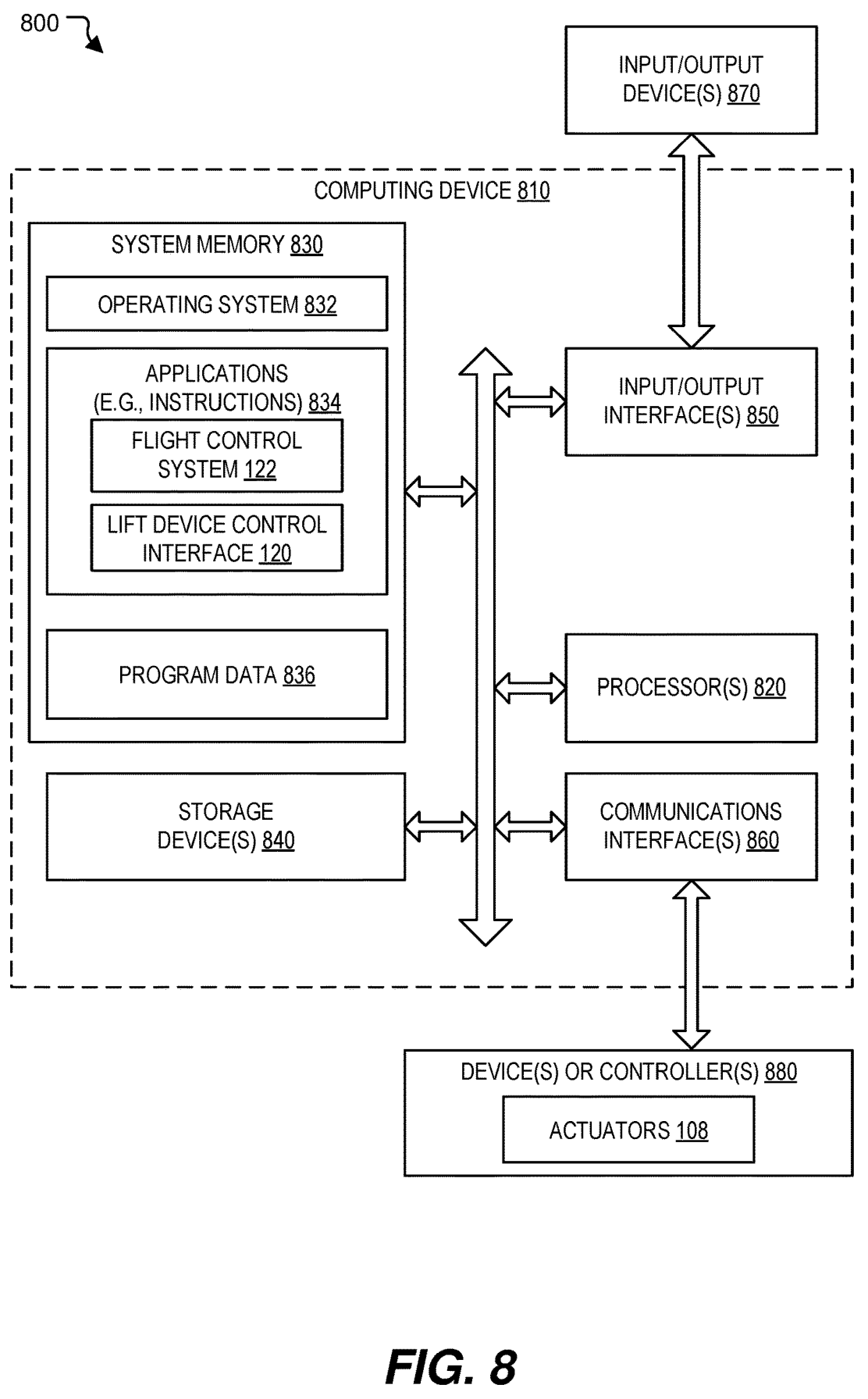

COMPUTING DEVICE 810

SYSTEM MEMORY 830

OPERATING SYSTEM 832

APPLICATIONS
(E.G., INSTRUCTIONS) 834

FLIGHT CONTROL
SYSTEM 122

LIFT DEVICE CONTROL
INTERFACE 120

PROGRAM DATA 836

STORAGE
DEVICE(S) 840

INPUT/OUTPUT
DEVICE(S) 870

INPUT/OUTPUT
INTERFACE(S) 850

PROCESSOR(S) 820

COMMUNICATIONS
INTERFACE(S) 860

DEVICE(S) OR CONTROLLER(S) 880

ACTUATORS 108

*FIG. 8*

SYSTEMS AND METHODS OF AIRCRAFT LIFT CONTROL

FIELD OF THE DISCLOSURE

The present disclosure is generally related to aircraft lift control.

BACKGROUND

Aircraft flap control levers are used by pilots to control the position of flaps, which are movable surfaces on the wings of an aircraft that are used to change the shape and lift characteristics of the wings during different phases of flight. For example, during takeoff, the flaps are typically extended to a specific position to increase lift and improve the aircraft's takeoff performance. Similarly, during landing, the flaps are extended to a specific position to increase lift and lower the aircraft's approach speed. Having the pilot operate the flap control lever increases pilot workload while the pilot is also managing many other tasks during takeoff and landing.

SUMMARY

In a particular implementation, an aircraft includes actuators coupled to a lift device. The aircraft also includes a lift device control interface disposed on a flight deck of the aircraft. The lift device control interface is configured to receive a pilot input. The aircraft further includes a flight control system configured to generate a command corresponding to a target lift device position. The flight control system is also configured to send the command to the lift device control interface to cause the lift device control interface to indicate the target lift device position. The flight control system is further configured to send a control signal to the actuators to set the lift device to the target lift device position.

In another particular implementation, a method includes determining, at a flight control system of an aircraft, a target lift device position. The method also includes sending, from the flight control system to a lift device control interface of the aircraft, a command to indicate the target lift device position at the lift device control interface. The method further includes sending a control signal from the flight control system to actuators to set a lift device of the aircraft to the target lift device position.

In another particular implementation, a line-replaceable unit includes a flight control system configured to generate a command corresponding to a target lift device position. The flight control system is also configured to send the command to a lift device control interface of an aircraft to cause the lift device control interface to indicate the target lift device position. The flight control system is further configured to send a control signal to actuators to set a lift device of the aircraft to the target lift device position.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 3 is a diagram of another implementation of components of the system of FIG. 1.

FIG. 5 is a diagram that illustrates a flow chart of an example of a method of aircraft lift control.

FIG. 6 is a flowchart illustrating an example of a life cycle of an aircraft of FIG. 1.

FIG. 8 is a block diagram of a computing environment including a computing device configured to support aspects of computer-implemented methods and computer-executable program instructions (or code) according to the present disclosure.

DETAILED DESCRIPTION

Figure 1:
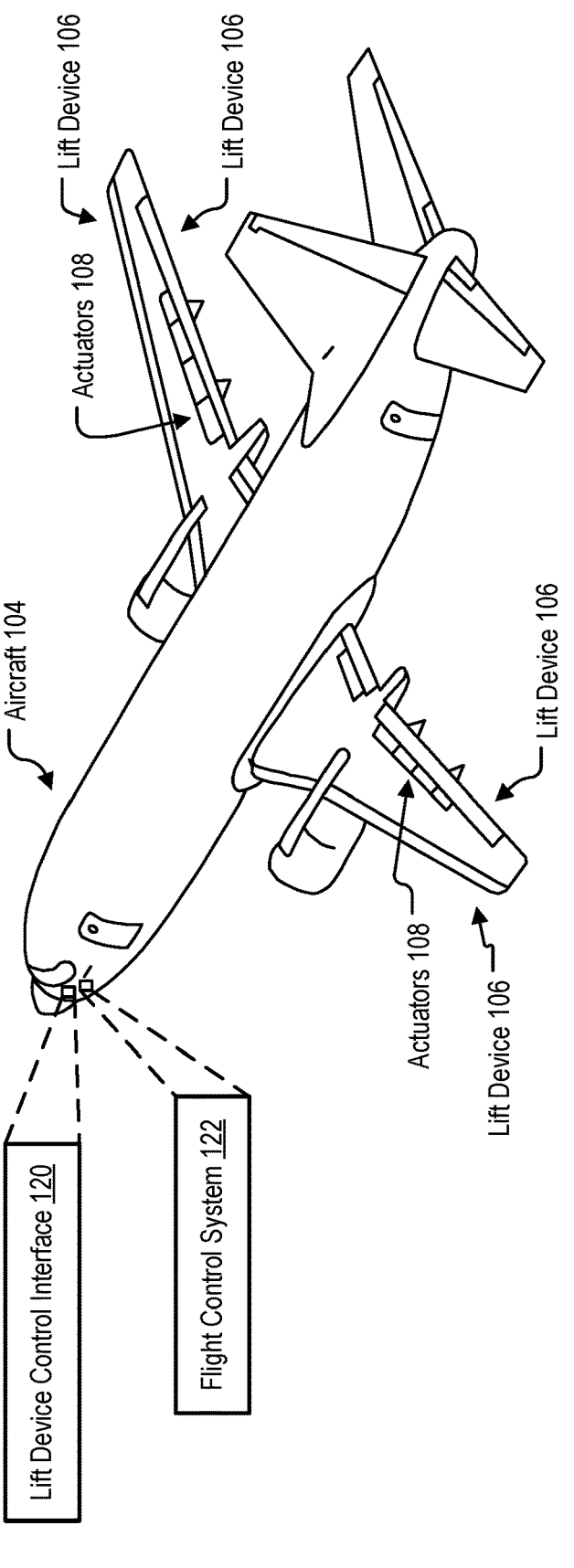
FIG. 1 is a diagram that illustrates a system configured to perform aircraft lift control.

Aspects disclosed herein present systems and methods of aircraft lift control. A flap control lever is used to extend or retract high lift surfaces. Typically, the flap control lever is moved and placed in different detents by a pilot to adjust the high lift surfaces. Having the pilot operate the flap control lever increases pilot workload while the pilot is also managing many other tasks during takeoff and landing.

An aircraft includes actuators that are coupled to a lift device. For example, the lift device includes flaps, slats, leading edge devices, spoilers, etc. A lift device control interface is disposed on a flight deck of the aircraft. In a lever implementation, the lift device control interface includes a control lever (e.g., a flap control lever) that is movable between lever positions. Each lever position corresponds to a respective lift device position. In a button implementation, the lift device control interface includes buttons with each button corresponding to a respective lift device position.

The lift device control interface includes one or more sensors that are configured to generate sensor data corresponding to a target lift device position. In a particular aspect, the lift device control interface sends sensor data to the flight control system responsive to receiving a pilot input that corresponds to the target lift device position. In the lever implementation, the pilot input is based on a pilot moving the control lever to a particular lever position corresponding to the target lift device position. In this implementation, the sensor data indicates a detected position of the control lever. In the button implementation, the pilot input is based on a pilot selecting (e.g., activating) a particular button corresponding to the target lift device position. In this implementation, the sensor data indicates that the particular button is selected (e.g., activated). The flight control system, responsive to receiving the sensor data corresponding to the target lift device position, sends a control signal to the actuators to set the lift device to the target lift device position.

Additionally, the flight control system is configured to, when an auto-lift mode is engaged, determine a target lift device position independently of the sensor data from the lift device control interface. For example, the flight control system determines the target lift device position based on various inputs. The flight control system sends a command to the lift device control interface to cause the lift device control interface to indicate the target lift device position, and sends a control signal to the actuators to set the lift device to the target lift device position. In some examples of the lever implementation, the lift device control interface, in response to receiving the command, uses a motor to move the control lever to a particular lever position corresponding to the target lift device position. In the button implementation, the lift device control interface selects (e.g., visually distinguishes) a button corresponding to the target lift device position. The actuators, responsive to the control signal, set the lift device to the target lift device position. The flight control system thus enables automatic aircraft lift control.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple notches are illustrated and associated with reference numbers 250A, 250B, 250C, 250D, and 250E. When referring to a particular one of these notches, such as the notch 250A, the distinguishing letter "A" is used. However, when referring to any arbitrary one of these notches or to these notches as a group, the reference number 250 is used without a distinguishing letter.

Figure 2:
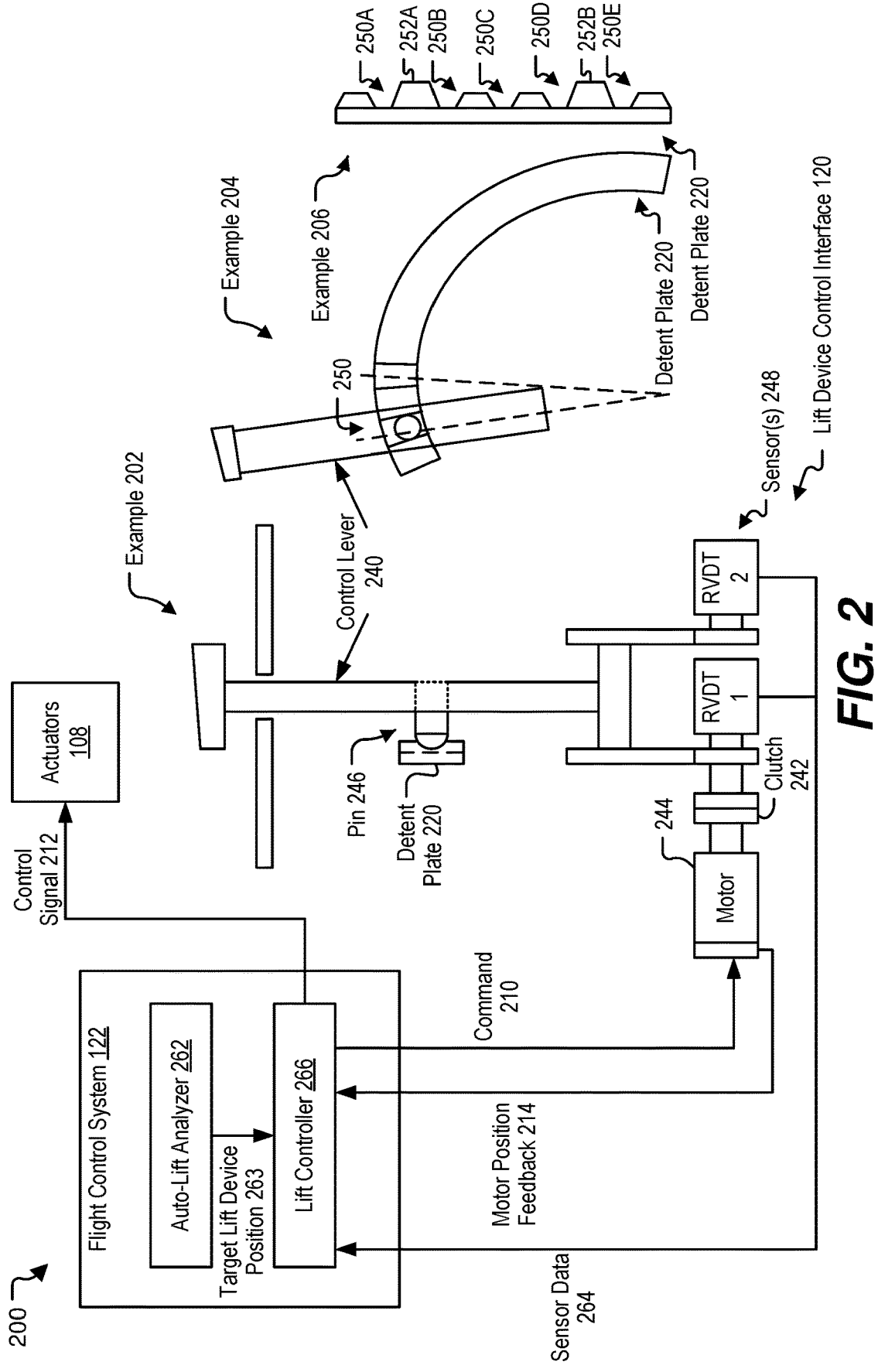
FIG. 2 is a diagram of a particular implementation of components of the system of FIG. 1.

As used herein, various terminology is used for the purpose of describing particular implementations only and is not intended to be limiting. For example, the singular forms "a." "an," and "the" are intended to include the plural forms as well, unless the context clearly indicates otherwise. Further, some features described herein are singular in some implementations and plural in other implementations. To illustrate, FIG. 2 depicts an example 202 of a lift device control interface including one or more sensors ("sensor(s)" 248 in FIG. 2), which indicates that in some implementations the lift device control interface includes a single sensor 248 and in other implementations the lift device control interface includes multiple sensors 248. For ease of reference herein, such features are generally introduced as "one or more" features, and are subsequently referred to in the singular or optional plural (as typically indicated by "(s)") unless aspects related to multiple of the features are being described.

The terms "comprise." "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating." "calculating." "using." "selecting." "accessing." and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to perform aircraft lift control. The system 100 includes an aircraft 104 that includes actuators 108 coupled to lift devices 106. A lift device 106 includes a component of the aircraft 104 that modifies the aerodynamic shape of a wing of the aircraft 104 to increase or decrease lift generated by the wing under particular conditions (e.g., at a particular airspeed). For example, a lift device 106 can include one or more of flaps, slats, leading-edge devices, spoilers, or other types of lift components.

The actuators 108 are configured to adjust a lift device 106 to increase or decrease lift. For example, the actuators 108 can extend the flaps to increase a wing surface area and curvature to increase lift at slower speeds, such as during takeoff and landing. As another example, the actuators 108 can raise the spoilers to reduce lift and increase drag to slow down the aircraft 104 during descent or landing.

The aircraft 104 is coupled to (e.g., includes) a lift device control interface 120 and a flight control system 122. The flight control system 122 is configured to provide control signals to the actuators 108 to adjust the lift devices 106. In an example, the lift device control interface 120 is disposed on a flight deck of the aircraft 104 and is configured to send sensor data corresponding to pilot input to the flight control system 122. The flight control system 122 is configured to, based on the sensor data, send control signals to the actuators 108 to adjust the lift device 106. As another example, the flight control system 122 is configured to generate control signals independently of the sensor data and to send the control signals to the actuators 108 to adjust the lift devices 106 to the target lift device positions. To illustrate, when an auto-lift mode is disengaged, the flight control system 122 is configured to send control signals responsive to sensor data that corresponds to pilot input. When the auto-lift mode is engaged, the flight control system 122 is configured to send control signals independently of the sensor data. In some implementations, when the auto-lift mode is engaged, the pilot can provide pilot input to disengage the auto-lift mode and override the control signals generated independently of the sensor data.

In some implementations, the lift device control interface 120, the flight control system 122, or both, are included in a line-replaceable unit (LRU). In some implementations, one or more portions of the lift device control interface 120, the flight control system 122, or both, are implemented by a processor using dedicated hardware, firmware, or a combination thereof. The processor can be implemented as a single processor or as multiple processors, such as in a multi-core configuration, a multi-processor configuration, a distributed computing configuration, a cloud computing configuration, or any combination thereof.

During operation, when an auto-lift mode is engaged, the flight control system 122 determines a target lift device position. For example, the flight control system 122 determines the target lift device position based on various inputs, such as airspeed, ground speed, altitude, engine running status, engine throttle position, air temperature, angle of arrival, airplane-on-ground status, gross weight, runway length, runway condition, steering angle, system pressure, landing gear position, or a combination thereof. The flight control system 122 sends a command to the lift device control interface 120 to cause the lift device control interface 120 to indicate the target lift device position, and sends a control signal to the actuators 108 to set the lift device 106 to the target lift device position, as further described with reference to FIGS. 2-4.

In some examples, the lift device control interface 120, in response to a pilot input corresponding to a second target lift device position, sends sensor data to the flight control system 122, and the flight control system 122 sends a second control signal to the actuators 108 to set the lift device 106 to the second target lift device position, as further described with reference to FIGS. 2-4. In some implementations, the flight control system 122 disengages the auto-lift mode in response to receiving the pilot input when the auto-lift mode is engaged. The pilot can thus override the target lift device position automatically generated at the flight control system 122.

The flight control system 122 thus enables automatic aircraft lift control. For example, when the auto-lift mode is engaged, the flight control system 122 automatically generates target lift device positions and provides control signals to the actuators 108 to adjust the lift device 106 to the target lift device positions. The pilot can provide pilot input to override the automatically generated target lift device positions and disengage the auto-lift mode. When the auto-lift mode is disengaged, the flight control system 122 provides control signals to the actuators 108 responsive to sensor data that corresponds to pilot input.

Although FIG. 1 depicts the lift device control interface 120 and the flight control system 122 included in the aircraft 104, in some implementations the lift device control interface 120, the flight control system 122, or both can be external to the aircraft 104. For example, the lift device control interface 120, the flight control system 122, or both, can be included in a ground control system in addition to or as an alternative to being included in the aircraft 104. To illustrate, in some implementations, the aircraft 104 can be remotely piloted from the ground control system.

Although the lift device control interface 120 and the flight control system 122 are depicted as separate components, in other implementations the described functionality of the lift device control interface 120 and the flight control system 122 can be performed by a single component. In some implementations, each of the lift device control interface 120 and the flight control system 122 can be represented in hardware, such as via an application-specific integrated circuit (ASIC) or a field-programmable gate array (FPGA), or the operations described with reference to the elements may be performed by a processor executing computer-readable instructions.

Referring to FIG. 2, a diagram 200 is shown of a particular implementation of components of the system 100 of FIG. 1. In an example 202, the flight control system 122 includes an auto-lift analyzer 262 coupled to a lift controller 266. The lift device control interface 120 includes a motor 244 (e.g., a servo motor) coupled via a clutch 242 to a control lever 240. The lift controller 266 is coupled to the actuators 108 and to the motor 244.

The control lever 240 is movable between lever positions. Each lever position corresponds to a respective lift device position. In a particular implementation, the control lever 240 includes a pin 246 that is configured to engage with a detent plate 220. The detent plate 220 includes a plurality of notches 250. Each of the plurality of notches 250 corresponds to a respective control lever position and a respective lift device position.

In a particular implementation, the pin 246 is spring-loaded and can move between a retracted position and an extended position. In some aspects, the pin 246 retracts and extends to move from a first notch 250 to a second notch 250 when a force is applied to move the control lever 240 from a first control lever position to a second control lever position. In an example 204, the pin 246 is engaged with a notch 250 of the detent plate 220. In an example 206, the detent plate 220 includes a notch 250A, a notch 250B, a notch 250C, a notch 250D, and a notch 250E. The detent plate 220 including five notches is provided as an illustrative example. In other examples, the detent plate 220 can include fewer than five or more than five notches.

In some implementations, the detent plate 220 includes one or more gates 252 corresponding to lift device positions associated with transitions between phases of high lift configuration. For example, the notch 250B corresponds to a first lift device position and the notch 250D corresponds to a second lift device position. Lift device positions between the first lift device position and the second lift device position correspond to a first lift configuration phase (e.g., using slats and flaps). The detent plate 220 includes a gate 252A to move beyond the notch 250B (e.g., to the notch 250A and beyond) and a gate 252B to move beyond the notch 250D (e.g., to the notch 250E and beyond). In a particular aspect, lift device positions corresponding to notches beyond the gate 252A (e.g., the notch 250A and beyond) correspond to a second lift configuration phase (e.g., using slats and not using flaps). In a particular aspect, lift device positions corresponding to notches beyond the gate 252B (e.g., the notch 250E and beyond) correspond to a third lift configuration phase (e.g., atypical configurations corresponding to greater high lift surface extension).

In some examples, the notch 250A corresponds to a first lift configuration in which lift devices (e.g., the lift device 106) are in a stowed position. The notch 250B may correspond to a second lift configuration associated with leading edge lift device deployment. The gate 252A that is between the notches 250A and 250B can increase pilot awareness to prevent the pilot in control from erroneously retracting the leading edge lift devices when moving the control lever 240 in a retract direction (e.g., towards the notch 250A). The retraction of the leading edge lift devices can result in a large change in lift generated and is thus considered a protected lift configuration. Similarly, for example, the notch 250E may correspond to a third lift configuration associated with all engine go around. Thus, the transition from the notch 250E to the notch 250D can be an important transition in lift configuration and the gate 252B can increase pilot awareness to prevent the pilot from erroneously overshooting that position when moving the control lever 240 in the retract direction.

The one or more gates 252 can increase pilot awareness of moving between lift configuration phases. In some implementations, a greater force is applied to the control lever 240 to move past a gate 252. In some implementations, a feel (e.g., to a pilot's hand) of the control lever 240 moving over a gate 252 (e.g., from the notch 250B to the notch 250A) is different than moving from a notch to another notch without a gate 252 there-between (e.g., from the notch 250C to the notch 250B).

The lift device control interface 120 includes the one or more sensors 248 that are configured to generate sensor data 264 indicating a detected position of the control lever 240. The lift device control interface 120 is configured to provide the sensor data 264 to the lift controller 266. The auto-lift analyzer 262 is configured to determine a target lift device position 263 based on various inputs and to provide the target lift device position 263 to the lift controller 266. For example, the auto-lift analyzer 262 determines the target lift device position 263 based on airspeed, ground speed, altitude, engine running status, engine throttle position, air temperature, angle of arrival, airplane-on-ground status, gross weight, runway length, runway condition, steering angle, system pressure, landing gear position, or a combination thereof.

The lift controller 266 is configured to generate a control signal 212 based on the target lift device position 263 or based on the sensor data 264, as described herein, and to provide the control signal 212 to the actuators 108. The actuators 108 are configured to adjust the lift device 106 to a lift device position corresponding to the control signal 212.

During operation, the auto-lift analyzer 262 determines a target lift device position 263 while an auto-lift mode is engaged and provides the target lift device position 263 to the lift controller 266. The lift controller 266, while the auto-lift mode is engaged, generates a command 210 to indicate the target lift device position 263 at the lift device control interface 120. The lift device control interface 120, responsive to the command 210, uses the motor 244 to move the control lever 240. For example, the command 210 is generated to move the control lever 240 to a target control lever position that corresponds to the target lift device position 263. In an example, the lift controller 266 provides the command 210 to the motor 244 to generate a first force. The first force is transferred by the clutch 242 to the control lever 240 to move the control lever 240 to the target control lever position.

In a particular implementation, the lift controller 266 receives motor position feedback 214 from the motor 244 indicating a detected motor position of the motor 244. In some examples, the lift controller 266 updates the command 210 based on a comparison of the detected motor position and a target motor position corresponding to the target control lever position. In some implementations, the lift controller 266 updates the command 210 based on a comparison of a position of the control lever 240 (e.g., as indicated by sensor data 264 from the one or more sensors 248) and the target control lever position.

The lift controller 266, responsive to receiving the target lift device position 263 from the auto-lift analyzer 262 while the auto-lift mode is engaged, sends a control signal 212 to the actuators 108 to set the lift device 106 to the target lift device position 263. The actuators 108, responsive to the control signal 212, adjust the lift device 106 to the target lift device position 263.

In a particular implementation, the lift device control interface 120, responsive to the command 210, includes a visual indicator of the target control lever position corresponding to the target lift device position 263. As an example, the lift device control interface 120 can, responsive to the command 210, indicate the target lift device position 263 by moving the control lever 240 to the target control lever position, by activating a visual indicator (e.g., a red light) at the target control lever position, or both. In some implementations, the lift device control interface 120, responsive to receiving the command 210, activates a light at the target control lever position to have a first color (e.g., red). The lift device control interface 120, responsive to determining that a detected control lever position matches the target control lever position, activates the light to have a second color (e.g., green).

The target lift device position 263 selected by the auto-lift analyzer 262 can be overridden using pilot input, such as by moving the control lever 240 or pressing an auto-lift mode button. In an example, the clutch 242 is configured to slip responsive to a force from the control lever 240 to disconnect the motor 244 from the control lever 240. To illustrate, a pilot manually moves the control lever 240 and the clutch 242 slips responsive to a force from the control lever 240 to disconnect the motor 244 from the control lever 240. In a particular implementation, the lift controller 266, responsive to a force from the control lever 240, slipping of the clutch 242, or both, disengages the auto-lift mode. In a particular implementation, the lift controller 266 detects the slippage of the clutch 242 based on a comparison of the motor position feedback 214 and a detected position of the control lever 240 (as indicated by the sensor data 264). In an example, the lift controller 266 uses a rotary variable differential transformer (RVDT) for the comparison of the detected position and the motor position feedback 214. In a particular implementation, the lift device control interface 120 includes a visual indicator (e.g., a light, a switch, or both), an aural indicator (e.g., a sound or recorded speech), or both, of whether the auto-lift mode is engaged.

When the auto-lift mode is disengaged, the lift controller 266 generates a control signal 212 based on the sensor data 264. In an example, the one or more sensors 248 generate the sensor data 264 indicating a detected position of the control lever 240 and provide the sensor data 264 to the lift controller 266. The lift controller 266 generates a control signal 212 based on the detected position. In a particular aspect, the lift controller 266 generates a control signal 212 as the one or more sensors 248 detect movement of the control lever 240 from a particular control lever position to a target control lever position corresponding to a target lift device position (e.g., selected by a pilot). The lift controller 266 provides the control signal 212 to the actuators 108 to adjust the lift device 106 from a particular lift device position (corresponding to the particular control lever position) to the target lift device position.

In an example, as the one or more sensors 248 detect that the control lever 240 is moving in a first direction from the particular control lever position to the target control lever position, the lift controller 266 generates a control signal 212 that causes the actuators 108 to move the lift device 106 in a corresponding direction from a particular lift device position to the target lift device position. Once the control lever 240 reaches the target control lever position and stops moving, the one or more sensors 248 generate the sensor data 264 indicating that movement of the control lever 240 has stopped and the lift controller 266 stops sending the control signal 212 to the actuators 108.

In some examples, the one or more sensors 248 detect that the control lever 240 has changed from a first control lever position to a target control lever position, the lift controller 266 generates a control signal 212 that causes the actuators 108 to move the lift device 106 from a first lift device position (corresponding to the first control lever position) to the target lift device position.

The flight control system 122 thus enables automatic aircraft lift control. For example, when the auto-lift mode is engaged, the flight control system 122 provides control signals 212 to the actuators 108 to adjust the lift device 106 to the target lift device position 263 determined by the auto-lift analyzer 262. The pilot can provide pilot input to override the automatically generated target lift device position 263 and disengage the auto-lift mode. When the auto-lift mode is disengaged, the flight control system 122 provides control signals 212 to the actuators 108 responsive to sensor data 264 corresponding to pilot input.

In some implementations, the lift device control interface 120 and the flight control system 122 can be added to a legacy flight control system (e.g., a legacy LRU) that includes at least one of the control lever 240, the detent plate 220, or the one or more sensors 248. For example, the flight control system 122, the motor 244, the clutch 242, or a combination thereof, can be added to the legacy system.

In FIG. 3, a diagram 300 is shown of an implementation of components of the system 100 of FIG. 1. The diagram 300 includes an example 302 of an implementation of the lift device control interface 120 in which the pin 246 moves parallel to the control lever 240 to engage with the detent plate 220. The diagram 300 includes an example 304 of a side view of a portion of the lift device control interface 120. Particular configurations of the detent plate 220 and the pin 246 are provided as illustrative non-limiting examples. The detent plate 220 and the pin 246 can have various configurations in other examples.

Figure 4:
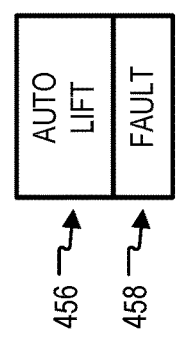
FIG. 4 is a diagram of another implementation of components of the system of FIG. 1.

Referring to FIG. 4, a diagram 400 is shown of an implementation of components of the system 100 of FIG. 1. The lift device control interface 120 includes a plurality of buttons 452 corresponding to lift device positions. For example, each of the buttons 452 corresponds to a respective lift device position. In a particular implementation, the buttons 452 are included in a touchscreen.

In some implementations, the lift device control interface 120 includes visual indications of transitions between lift configuration phases. For example, the buttons 452 include a button 452A corresponding to a first lift device position and a button 452B corresponding to a second lift device position. Lift device positions between the first lift device position and the second lift device position correspond to a first lift configuration phase (e.g., using slats and flaps). The button 452A includes a visual indication (e.g., larger circles, a light, etc.) to indicate that any buttons (e.g., a button 452C) beyond the button 452A correspond to a second lift configuration phase (e.g., using slats and not using flaps).

Similarly, the button 452B includes a visual indication (e.g., larger circles, a light, etc.) to indicate that any buttons (e.g., a button 452D and a button 452E) beyond the button 452B correspond to a third lift configuration phase (e.g., an atypical configuration).

In a particular implementation, the button 452C includes a first visual indication (e.g., a green light) indicating that a first lift device position corresponding to the button 452C is a detected lift device position (e.g., a current lift device position). In a particular implementation, a button 452F includes a second visual indication (e.g., a red light) indicating that the button 452F corresponds to a target lift device position. As the lift device position changes from the first lift device position to the target lift device position, visual indications of corresponding buttons change to include the first visual indication (e.g., the green light). For example, the first visual indication (e.g., the green light) is deactivated at the button 452C and activated at the button 452A as the detected lift device position changes from the first lift device position to a second lift device position (corresponding to the button 452A) and so on until the detected lift device position corresponds to the target lift device position and the first visual indication is activated at the button 452F and second visual indication (e.g., the red light) is deactivated at the button 452F.

In a particular implementation, the lift device control interface 120 includes an auto-lift mode indicator 456, a fault indicator 458, or both. The auto-lift mode indicator 456 indicates whether the auto-lift mode is engaged and the fault indicator 458 indicates whether a fault is detected. In a particular implementation, when the fault indicator 458 indicates that a fault is detected, the auto-lift mode cannot be engaged. In some other implementations, the fault detection can be overridden by the pilot to engage the auto-lift mode.

During operation, a pilot engages the auto-lift mode by activating the auto-lift mode indicator 456 (e.g., by pressing an auto-lift mode button). The auto-lift analyzer 262, when the auto-lift mode is engaged, generates a target lift device position 263 and provides the target lift device position 263 to the lift controller 266. The lift controller 266, responsive to determining that the auto-lift mode is engaged, generates a command 210 corresponding to the target lift device position 263 and provides the command 210 to the lift device control interface 120. The lift controller 266, responsive to determining that the auto-lift mode is engaged, also generates a control signal 212 corresponding to the target lift device position 263 and provides the control signal 212 to the actuators 108.

The lift device control interface 120, in response to receiving the command 210, indicates the target lift device position 263 by activating a first visual indication (e.g., a red light) at the button 452F corresponding to the target lift device position. For example, activating the visual indication transforms the button 452F into a visually distinct button of the plurality of buttons 452.

The actuators 108, responsive to the control signal 212, set the lift device 106 to the target lift device position 263. The lift device control interface 120, in response to detecting a lift device position of the lift device 106, activates a second visual indication (e.g., a green light) of a button corresponding to the detected lift device position. As the lift device position moves from a first position to the target lift device position 263, the second visual indication (e.g., a green light) moves from the button 452C corresponding to the first position to the button 452F having the first visual indication (e.g., a red light) indicating the target lift device position 263. The lift device control interface 120, responsive to determining that a detected lift device position matches the target lift device position 263, changes the button 452F from having the first visual indication (e.g., a red light) to having the second visual indication (e.g., a green light).

In some examples, the lift controller 266 disengages the auto-lift mode responsive to pilot input. For example, the pilot input can be based on a pilot deactivating the auto-lift mode indicator 456 (e.g., by pressing the auto-lift mode button) or selection of a particular button 452 corresponding to a particular lift device position. In some implementations, the pilot can activate the execute button 454 subsequent to selecting the particular button 452 to set the particular lift device position as the target lift device position (e.g., a pilot selected target lift device position). For example, the lift controller 266 responsive to receiving sensor data 264 corresponding to a second pilot input indicating activation of the execute button 454 subsequent to receiving sensor data 264 corresponding to a first pilot input indicating a selection of the particular button 452, sends a control signal 212 corresponding to the particular lift device position to the actuators 108.

In a particular implementation, the flight control system 122, responsive to detecting a fault, disengages the auto-lift mode, updates the auto-lift mode indicator 456 to indicate that the auto-lift mode is disengaged, updates the fault indicator 458 to indicate that a fault is detected, or a combination thereof. In some aspects, the auto-lift mode cannot be engaged while the fault indicator 458 indicates that a fault is detected. In other aspects, the pilot can override the fault detection to engage the auto-lift mode.

Referring to FIG. 5, a particular implementation of a method 500 of aircraft lift control is shown. In a particular aspect, one or more operations of the method 500 are performed by at least one of the lift device control interface 120, the flight control system 122, the aircraft 104, the system 100 of FIG. 1, the auto-lift analyzer 262, or the lift controller 266 of FIG. 2.

The method 500 includes determining, at a flight control system of an aircraft, a target lift device position, at 502. For example, the auto-lift analyzer 262 determines a target lift device position 263 based on various inputs, as described with reference to FIGS. 1-2 and 4.

The method 500 also includes sending, from the flight control system to a lift device control interface of the aircraft, a command to indicate the target lift device position at the lift device control interface, at 504. For example, the lift controller 266 sends, to the lift device control interface 120, a command 210 to indicate the target lift device position 263 at the lift device control interface 120. In some implementations, the lift device control interface 120 moves the control lever 240 to a target control lever position corresponding to the target lift device position 263, activates a visual indication at the target control lever position, or both, to indicate the target lift device position 263, as described with reference to FIG. 2. In some implementations, the lift device control interface 120 activates a visual indication (e.g., a red light) of a particular button 452 corresponding to the target lift device position 263 to indicate the target lift device position 263, as described with reference to FIG. 4.

The method 500 further includes sending a control signal from the flight control system to actuators to set a lift device of the aircraft to the target lift device position, at 506. For example, the lift controller 266 sends a control signal 212 to the actuators 108 to set the lift device 106 of the aircraft 104 to the target lift device position 263, as described with reference to FIGS. 1-2 and 4.

The method 500 thus enables automatic aircraft lift control. For example, when the auto-lift mode is engaged, the flight control system 122 sends commands to the lift device control interface 120 to indicate the target lift device position 263 and sends control signals 212 to the actuators 108 to automatically adjust the lift device 106.

Referring to FIG. 6, a flowchart illustrative of a life cycle of an aircraft that is configured to perform aircraft lift control is shown and designated as method 600. During pre-production, the exemplary method 600 includes, at 602, specification and design of an aircraft, such as the aircraft 104 described with reference to FIG. 7. During specification and design of the aircraft, the method 600 may include specification and design of an aircraft lift control system 616. The aircraft lift control system 616 includes the lift device control interface 120, the flight control system 122, or both. At 604, the method 600 includes material procurement, which may include procuring materials for the aircraft lift control system 616.

During production, the method 600 includes, at 606, component and subassembly manufacturing and, at 608, system integration of the aircraft. For example, the method 600 may include component and subassembly manufacturing of the aircraft lift control system 616 and system integration of the aircraft lift control system 616. At 610, the method 600 includes certification and delivery of the aircraft and, at 612, placing the aircraft in service. Certification and delivery may include certification of the aircraft lift control system 616 to place the aircraft lift control system 616 in service. While in service by a customer, the aircraft may be scheduled for routine maintenance and service (which may also include modification, reconfiguration, refurbishment, and so on). At 614, the method 600 includes performing maintenance and service on the aircraft, which may include performing maintenance and service on the aircraft lift control system 616.

Each of the processes of the method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is the aircraft 104 as shown in FIG. 7.

Figure 7:
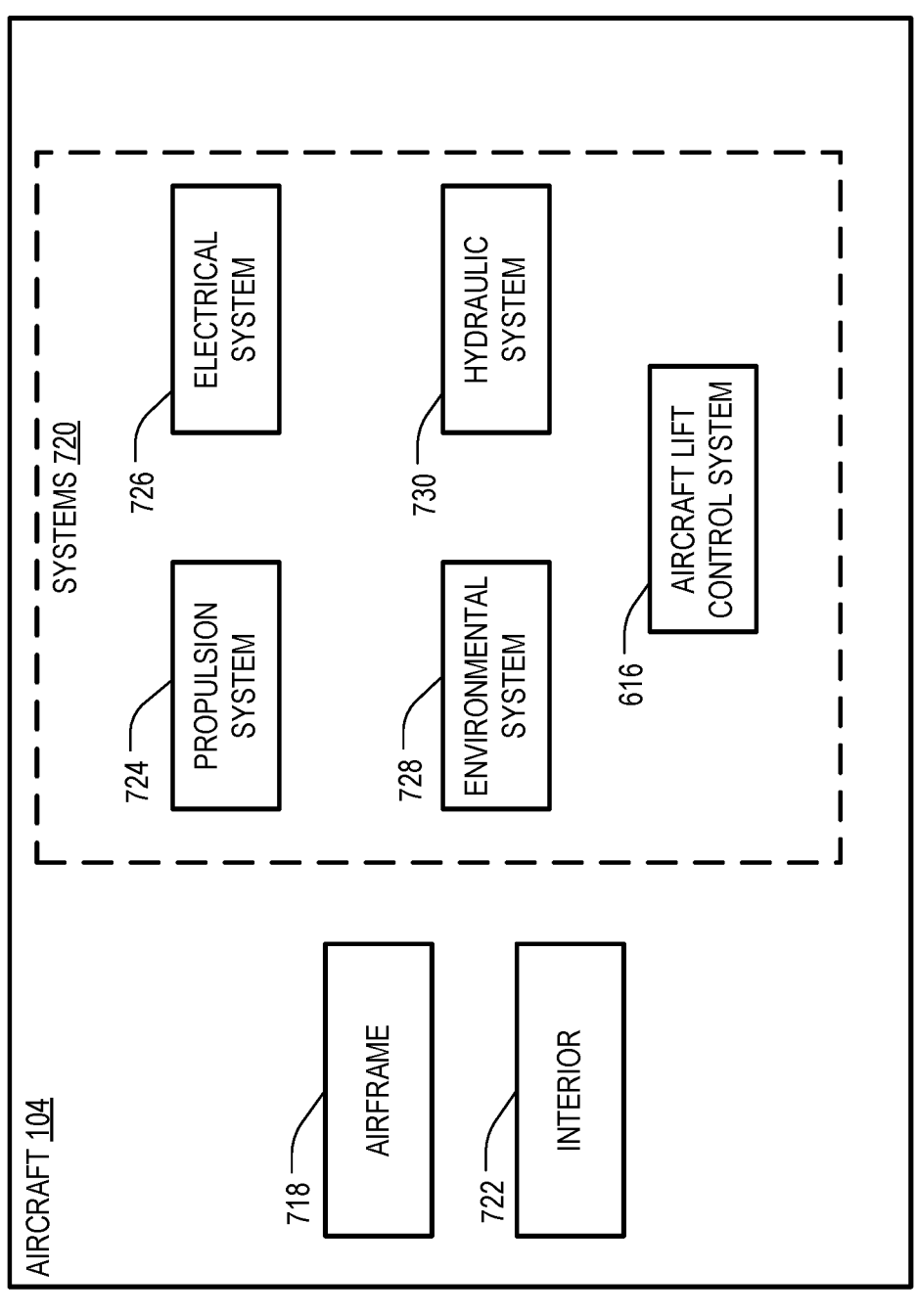
FIG. 7 is a block diagram of a particular implementation of the aircraft of FIG. 1.

In the example of FIG. 7, the aircraft 104 includes an airframe 718 with a plurality of systems 720 and an interior 722. Examples of the plurality of systems 720 include one or more of a propulsion system 724, an electrical system 726, an environmental system 728, a hydraulic system 730, and the aircraft lift control system 616. Any number of other systems may be included.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which may include a basic input/output system for booting the computing device 810 as well as a full operating system to enable the computing device 810 to interact with users, other programs, and other devices. The system memory 830 stores system (program) data 836, such as a target lift device position 263, sensor data 264, a pilot selected target lift device position, a target control lever position, an auto-lift mode indication, a fault indication, or a combination thereof.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1-7. To illustrate, the one or more applications 834 include instructions executable by the processor(s) 820 to initiate, control, or perform one or more operations described with reference to the lift device control interface 120, the flight control system 122, or both.

In a particular implementation, the system memory 830 includes a non-transitory, computer readable medium storing the instructions that, when executed by the processor(s) 820, cause the processor(s) 820 to initiate, perform, or control operations to perform aircraft lift control. The operations include determining, at a flight control system (122) of an aircraft (e.g., the aircraft 104), a target lift device position (e.g., the target lift device position 263). The operations also include sending, from the flight control system to a lift device control interface (e.g., the lift device control interface 120), a command (e.g., the command 210) to indicate the target lift device position at the lift device control interface. The operations further include sending a control signal (e.g., the control signal 212) from the flight control system to actuators (e.g., the actuators 108) to set a lift device (e.g., the lift device 106) of the aircraft to the target lift device position.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, include tangible computer-readable media. In a particular aspect, one or more of the storage devices 840 are external to the computing device 810.

The one or more input/output interfaces 850 enable the computing device 810 to communicate with one or more input/output devices 870 to facilitate user interaction. For example, the one or more input/output interfaces 850 can include a display interface, an input interface, or both. For example, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 870 includes one or more user interface devices and displays, including some combination of buttons, keyboards, pointing devices, displays, speakers, microphones, touch screens, and other devices.

The processor(s) 820 are configured to communicate with devices or controllers 880 via the one or more communications interfaces 860. For example, the one or more communications interfaces 860 can include a network interface. The devices or controllers 880 can include, for example, the actuators 108, the lift device 106, one or more other devices, or any combination thereof.

In conjunction with the described systems and methods, an apparatus for performing aircraft lift control is disclosed that includes means for determining, at a flight control system of an aircraft, a target lift device position. In some implementations, the means for determining corresponds to the flight control system 122, the aircraft 104, the system 100, the auto-lift analyzer 262, the computing device 810, the processor(s) 820, one or more other circuits or devices configured to determine a target lift device position, or a combination thereof.

The apparatus also includes means for sending, from the flight control system to a lift device control interface of the aircraft, a command to indicate the target lift device position at the lift device control interface. For example, the means for sending can correspond to the flight control system 122, the aircraft 104, the system 100, the lift controller 266, the computing device 810, the processor(s) 820, one or more other circuits or devices configured to send a command to indicate the target lift device position, or a combination thereof.

The apparatus further includes means for sending a control signal from the flight control system to actuators to set a lift device of the aircraft to the target lift device position. For example, the means for sending the control signal can correspond to the flight control system 122, the aircraft 104, the system 100, the lift controller 266, the computing device 810, the processor(s) 820, one or more other circuits or devices configured to send a control signal, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, an aircraft includes actuators coupled to a lift device. The aircraft also includes a lift device control interface disposed on a flight deck of the aircraft. The lift device control interface is configured to receive pilot input. The aircraft further includes a flight control system configured to generate a command corresponding to a target lift device position. The flight control system is also configured to send the command to the lift device control interface to cause the lift device control interface to indicate the target lift device position. The flight control system is further configured to send a control signal to the actuators to set the lift device to the target lift device position.

Example 2 includes the aircraft of Example 1, wherein the lift device includes one or more of flaps, slats, leading-edge devices, or spoilers.

Example 3 includes the aircraft of Example 1 or Example 2, wherein the lift device control interface includes buttons corresponding to lift device positions.

Example 4 includes the aircraft of Example 3, wherein the target lift device position corresponds to a visually distinct button of the buttons.

Example 5 includes the aircraft of Example 3 or Example 4, wherein the buttons are included in a touchscreen.

Example 6 includes the aircraft of Example 1 or Example 2, wherein the lift device control interface includes a control lever movable between lever positions, and wherein each lever position corresponds to a respective lift device position.

Example 7 includes the aircraft of Example 6, wherein the lift device control interface is configured to, responsive to the command, use a motor to move the control lever.

Example 8 includes the aircraft of Example 6 or Example 7, further comprising one or more sensors configured to generate sensor data indicating a detected position of the control lever, wherein the pilot input corresponds to a movement of the control lever to the detected position, and wherein the flight control system is configured to send, based on the sensor data, a second control signal to the actuators to set the lift device to a second target lift device position that corresponds to the detected position of the control lever.

Example 9 includes the aircraft of any of Examples 6 to 8, wherein the lift device control interface includes a clutch that is configured to transfer a first force from a motor to the control lever.

Example 10 includes the aircraft of Example 9, wherein the clutch is configured to slip responsive to a second force from the control lever.

Example 11 includes the aircraft of any of Examples 1 to 10, wherein the flight control system is configured to generate the command when an auto-lift mode is engaged.

Example 12 includes the aircraft of Example 11, wherein the flight control system is configured to disengage the auto-lift mode responsive to the pilot input.

According to Example 13, a method includes determining, at a flight control system of an aircraft, a target lift device position. The method also includes sending, from the flight control system to a lift device control interface of the aircraft, a command to indicate the target lift device position at the lift device control interface. The method further includes sending a control signal from the flight control system to actuators to set a lift device of the aircraft to the target lift device position.

Example 14 includes the method of Example 13, wherein the lift device includes one or more of flaps, slats, leading-edge devices, or spoilers.

Example 15 includes the method of Example 13 or Example 14, wherein the lift device control interface includes buttons corresponding to lift device positions.

Example 16 includes the method of Example 15, wherein the target lift device position corresponds to a visually distinct button of the buttons.

Example 17 includes the method of Example 15 or Example 16, wherein the buttons are included in a touchscreen.

Example 18 includes the method of Example 13 or Example 14, wherein the lift device control interface includes a control lever movable between lever positions, and wherein each lever position corresponds to a respective lift device position.

Example 19 includes the method of Example 18, further comprising, responsive to the command, using a motor at the lift device control interface to move the control lever.

Example 20 includes the method of Example 18 or Example 19, further comprising: receiving, at the flight control system from one or more sensors, sensor data indicating a detected position of the control lever; and sending, from the flight control system, a second control signal to the actuators to set the lift device to a second target lift device position that corresponds to the detected position of the control lever.

Example 21 includes the method of any of Examples 18 to 20, further comprising using a clutch of the lift device control interface to transfer a first force from a motor to the control lever.

Example 22 includes the method of Example 21, wherein the clutch is configured to slip responsive to a second force from the control lever.

Example 23 includes the method of any of Examples 13 to 22, wherein the flight control system is configured to generate the command when an auto-lift mode is engaged.

Example 24 includes the method of Example 23, wherein the flight control system is configured to disengage the auto-lift mode responsive to a pilot input.

Example 25 includes the method of any of Examples 13 to 24, further including receiving, at the flight control system from the lift device control interface, sensor data corresponding to a first pilot input indicating a second target lift device position; and based at least on the first pilot input, sending a second control signal from the flight control system to the actuators to set the lift device to the second target lift device position.

Example 27 includes the method of Example 26, wherein the sensor data also corresponds to a second pilot input indicating an activation of an execute button, and wherein the second control signal is sent based on the second pilot input.

According to Example 28, a device includes: a memory configured to store instructions; and a processor configured to execute the instructions to perform the method of any of Examples 13 to 27.

According to Example 29, a non-transitory computer-readable medium stores instructions that, when executed by a processor, cause the processor to perform the method of any of Examples 13 to 27.

According to Example 30, an apparatus includes means for carrying out the method of any of Examples 13 to 27.

According to Example 31, a line-replaceable unit includes a flight control system configured to generate a command corresponding to a target lift device position. The flight control system is also configured to send the command to a lift device control interface of an aircraft to cause the lift device control interface to indicate the target lift device position. The flight control system is further configured to send a control signal to actuators to set a lift device of the aircraft to the target lift device position.

Example 32 includes the line-replaceable unit of Example 31, wherein the lift device control interface includes buttons corresponding to lift device positions.

Example 33 includes the line-replaceable unit of Example 32, wherein the target lift device position corresponds to a visually distinct button of the buttons.

Example 34 includes the line-replaceable unit of Example 32 or Example 33, wherein the buttons are included in a touchscreen.

Example 35 includes the line-replaceable unit of Example 31, wherein the lift device control interface includes a control lever movable between lever positions, and wherein each lever position corresponds to a respective lift device position.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
actuators coupled to a lift device;
a lift device control interface disposed on a flight deck of the aircraft and configured to receive a pilot input, wherein the lift device control interface includes a control lever movable between lever positions, and wherein each lever position corresponds to a respective lift device position; and
a flight control system configured to:
generate a command corresponding to a target lift device position;
send the command to the lift device control interface to cause a visual indicator of the lift device control interface to indicate that the control lever is to move to a target control lever position corresponding to the target lift device position that is distinct from a detected lift device position of the lift device; and
send a control signal to the actuators to set the lift device to the target lift device position.

2. The aircraft of claim 1, wherein the lift device includes one or more of flaps, slats, leading-edge devices, or spoilers.

3. The aircraft of claim 1, wherein the lift device control interface includes buttons corresponding to lift device positions.

4. The aircraft of claim 3, wherein the target lift device position corresponds to a visually distinct button of the buttons.

5. The aircraft of claim 3, wherein the buttons are included in a touchscreen.

6. The aircraft of claim 1, wherein the flight control system is configured to send the command to the lift device control interface at a time when the target lift device position differs from a detected lift device position of the lift device.

7. The aircraft of claim 1, wherein the lift device control interface is configured to, responsive to the command, use a motor to move the control lever.

8. The aircraft of claim 1, further comprising one or more sensors configured to generate sensor data indicating a detected position of the control lever, wherein the pilot input corresponds to a movement of the control lever to the detected position, and wherein the flight control system is configured to send, based on the sensor data, a second control signal to the actuators to set the lift device to a second target lift device position that corresponds to the detected position of the control lever.

9. The aircraft of claim 1, wherein the lift device control interface includes a clutch that is configured to transfer a first force from a motor to the control lever.

10. The aircraft of claim 9, wherein the clutch is configured to slip responsive to a second force from the control lever.

11. The aircraft of claim 1, wherein the flight control system is configured to generate the command when an auto-lift mode is engaged.

12. The aircraft of claim 11, wherein the flight control system is configured to disengage the auto-lift mode responsive to the pilot input.

13. A method comprising:
determining, at a flight control system of an aircraft, a target lift device position of a target lift device, wherein the target lift device is associated with a lift device control interface that includes a control lever movable between lever positions, and wherein each lever position corresponds to a respective lift device position;
sending, from the flight control system to the lift device control interface of the aircraft, a command to cause a visual indicator of the lift device control interface to indicate that the control lever is to move to a target control lever position corresponding to the target lift device position that is distinct from a detected lift device position of the target lift device; and
sending a control signal from the flight control system to actuators to set a lift device of the aircraft to the target lift device position.

14. The method of claim 13, further comprising:
receiving, at the flight control system from the lift device control interface, sensor data corresponding to a first pilot input indicating a second target lift device position; and based at least on the first pilot input, sending a second control signal from the flight control system to the actuators to set the lift device to the second target lift device position.

15. The method of claim 14, wherein the sensor data also corresponds to a second pilot input indicating an activation of an execute button, and wherein the second control signal is sent based on the second pilot input.

16. A line-replaceable unit comprising:

a flight control system configured to:

generate a command corresponding to a target lift device position of a target lift device, wherein the target lift device is associated with a lift device control interface that includes a control lever movable between lever positions, and wherein each lever position corresponds to a respective lift device position;

send the command to the lift device control interface of an aircraft to cause a visual indicator of the lift device control interface to indicate that the control lever is to move to a target control lever position corresponding to the target lift device position that is distinct from a detected lift device position of the target lift device; and send a control signal to actuators to set a lift device of the aircraft to the target lift device position.

17. The line-replaceable unit of claim 16, wherein the lift device control interface includes buttons corresponding to lift device positions.

18. The line-replaceable unit of claim 16, wherein the lift device control interface is configured to, responsive to the command, use a motor to move the control lever.

19. The line-replaceable unit of claim 16, wherein the lift device control interface includes a clutch that is configured to transfer a first force from a motor to the control lever.

20. The line-replaceable unit of claim 16, wherein the flight control system is configured to send the command to the lift device control interface at a time when the target lift device position differs from a detected lift device position of the lift device.

* * * * *